(12) United States Patent
Liu et al.

(10) Patent No.: US 12,354,074 B2
(45) Date of Patent: Jul. 8, 2025

(54) DATA PROCESSING APPARATUS

(71) Applicant: TOSHIBA TEC KABUSHIKI KAISHA, Tokyo (JP)

(72) Inventors: Xin Liu, Izunokuni Shizuoka (JP); Shigeki Nimiya, Yokohama Kanagawa (JP); Nobuharu Tozawa, Tagata Shizuoka (JP); Hajime Takei, Tokyo (JP); Yoshitaka Sakamoto, Soka Saitama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 234 days.

(21) Appl. No.: 18/078,024

(22) Filed: Dec. 8, 2022

(65) Prior Publication Data

US 2023/0325801 A1 Oct. 12, 2023

(30) Foreign Application Priority Data

Apr. 6, 2022 (JP) ................................. 2022-063491

(51) Int. Cl.
*G06Q 20/20* (2012.01)
(52) U.S. Cl.
CPC .................................. *G06Q 20/202* (2013.01)
(58) Field of Classification Search
CPC .................................................. G06Q 20/202
See application file for complete search history.

(56) References Cited

U.S. PATENT DOCUMENTS

| | | | |
|---|---|---|---|
| 7,774,251 B1* | 8/2010 | Prasad | G06Q 40/02 705/42 |
| 8,989,053 B1* | 3/2015 | Skaaksrud | H04W 4/80 370/255 |
| 9,595,061 B1* | 3/2017 | Ryan | G06F 16/258 |
| 9,947,054 B2* | 4/2018 | Kavis | G06Q 20/202 |
| 11,037,187 B2* | 6/2021 | Ericson | G06Q 30/0633 |
| 11,263,382 B1* | 3/2022 | Sharzer | G16H 10/60 |

(Continued)

FOREIGN PATENT DOCUMENTS

JP 2003-030751 A 1/2003

OTHER PUBLICATIONS

Kaewprathum, Thodsapon-Pete. "Architectural analysis of retail omni-channel and integration of cash it point-of-sale software with e-commerce platform." (2018). (Year: 2018).*

*Primary Examiner* — Nathan A Mitchell
(74) *Attorney, Agent, or Firm* — Kim & Stewart LLP

(57) ABSTRACT

A POS system for managing information from POS terminals, includes a first terminal in a first store and generating first information in a first format including data fields each storing data related to an item purchased in a transaction, a second terminal in a second store and generating second information in a second format including data fields each storing data related to an item purchased in a transaction, a store server configured to manage the first and second information, and a management server configured to acquire the first and second information from the store server, when the items indicated in the first and second information are identical, modify the first and second information such that each information includes the same data fields, aggregate the data in the corresponding fields of the first and second information, and transmit the aggregated data to the store server or an external device.

11 Claims, 9 Drawing Sheets

(56) References Cited

U.S. PATENT DOCUMENTS

| | | | |
|---|---|---|---|
| 2008/0189184 A1* | 8/2008 | Kubo | G06Q 20/12 705/16 |
| 2011/0119163 A1* | 5/2011 | Smith | G06Q 40/00 705/400 |
| 2014/0207592 A1* | 7/2014 | Kavis | G06Q 40/12 705/21 |
| 2015/0088676 A1* | 3/2015 | Elliott | G06Q 20/29 705/21 |
| 2015/0379536 A1* | 12/2015 | Gopinath | G06Q 30/0205 705/7.31 |
| 2016/0034475 A1* | 2/2016 | Manoochehri | G06F 16/17 707/756 |
| 2016/0335657 A1* | 11/2016 | Griffin | G06Q 30/0231 |
| 2018/0181957 A1* | 6/2018 | Crabtree | G06Q 20/401 |
| 2021/0350424 A1* | 11/2021 | Wetz | G06Q 30/06 |
| 2024/0241863 A1* | 7/2024 | Funasaki | G06F 16/17 |

\* cited by examiner

FIG. 4

| | | | | | |
|---|---|---|---|---|---|
| 51 | STORE ID | \multicolumn{4}{l|}{SP001} |
| 52 | TRANSACTION ID | \multicolumn{4}{l|}{00001} |
| 53 | TRANSACTION D/T | \multicolumn{4}{l|}{2022XXXX1123} |
| 54 | USER ID | \multicolumn{4}{l|}{U0010} |
| 55 | REGISTERED ITEM | ITEM CODE | ITEM NAME | PRICE | COUNT |
| | | 100000001 | ITEM A | 100 | 1 |
| | | 100000002 | ITEM B | 120 | 1 |
| | | 100000005 | ITEM E | 140 | 1 |
| | | 100000006 | ITEM F | 150 | 1 |
| | | 100000008 | ITEM H | 200 | 1 |
| 56 | TOTAL COUNT | \multicolumn{4}{l|}{5} |
| 57 | TOTAL AMOUNT | \multicolumn{4}{l|}{710} |
| 58 | PAYMENT AMOUNT | \multicolumn{4}{l|}{1000} |
| 59 | CHANGE | \multicolumn{4}{l|}{290} |

FIG. 5

| | | | | | |
|---|---|---|---|---|---|
| 61 — STORE ID | SP001 | | | | |
| 62 — TRANSACTION ID | 00001 | | | | |
| 63 — USER ID | U0010 | | | | |
| 64 — OPERATION HISTORY | ITEM CODE | ITEM NAME | PRICE | OPERATION TYPE | OPERATION D/T |
| | 100000001 | ITEM A | 100 | | 2022XXXX1101 |
| | 100000002 | ITEM B | 120 | | 2022XXXX1102 |
| | 100000003 | ITEM C | 400 | | 2022XXXX1103 |
| | 100000004 | ITEM D | 300 | | 2022XXXX1104 |
| | 100000005 | ITEM E | 140 | | 2022XXXX1105 |
| | 100000003 | ITEM C | 400 | | 2022XXXX1108 |
| | 100000006 | ITEM F | 150 | | 2022XXXX1109 |
| | 100000004 | ITEM D | 300 | | 2022XXXX1112 |
| | 100000007 | ITEM G | 250 | | 2022XXXX1113 |
| | 100000007 | ITEM G | 250 | | 2022XXXX1116 |
| | 100000008 | ITEM H | 200 | | 2022XXXX1120 |

FIG. 6

| | | 70 |
|---|---|---|
| 71 | POSTED D/T | 2022XXXX1225 |
| 72 | USER ID | 00001 |
| 73 | POSTED CONTENT | ABOUT ITEM B ... |

FIG. 7

| | | | |
|---|---|---|---|
| 81 | PROMOTION ID | | PR001 |
| 82 | PROMOTION PERIOD | | 2022XXXX-2022XXYY |
| 83 | PROMOTION TARGET | | ITEM F, ITEM G |
| 84 | PROMOTION CONTENT | | ... |

80

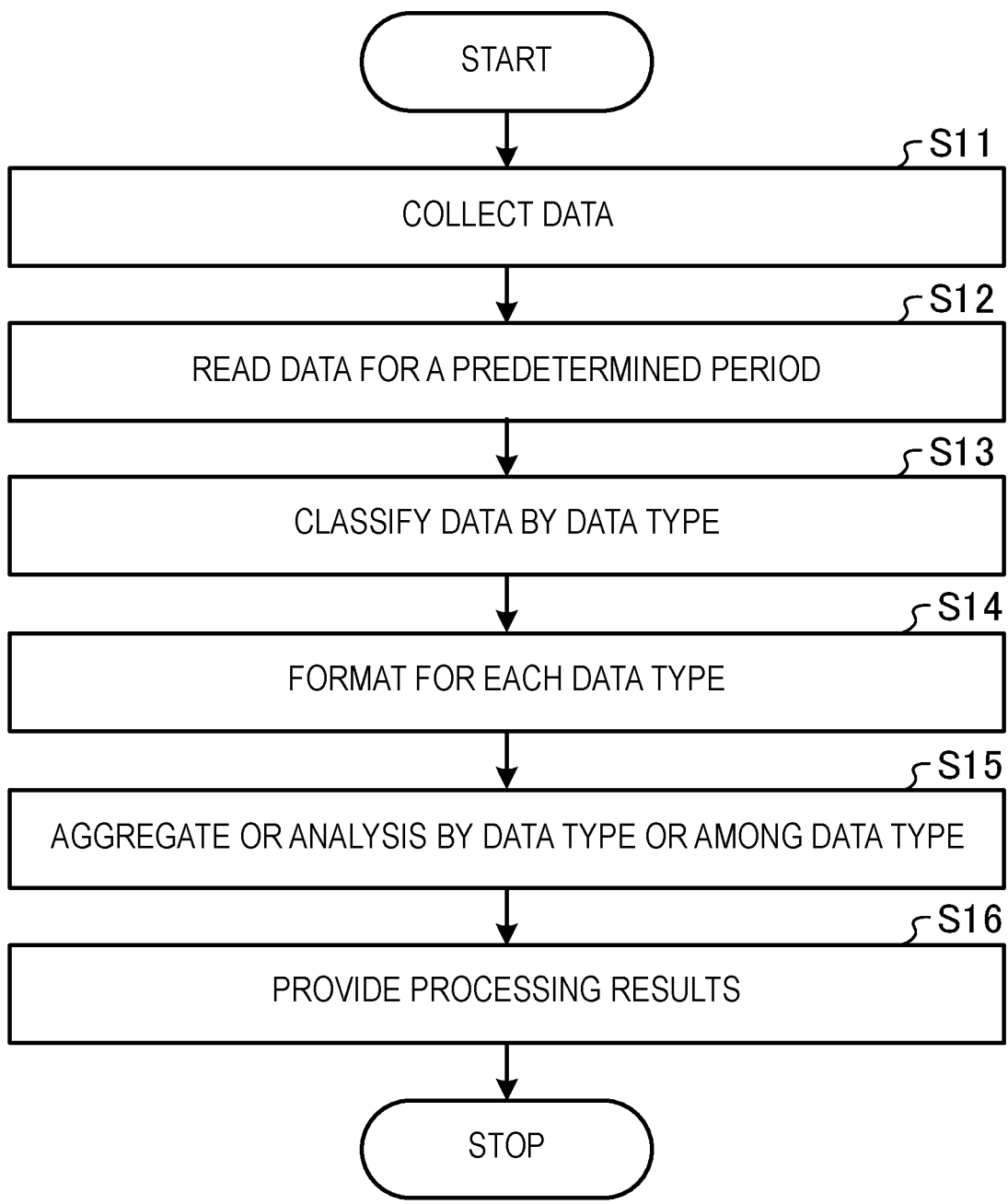

DATA PROCESSING APPARATUS

CROSS-REFERENCE TO RELATED APPLICATION(S)

This application is based upon and claims the benefit of priority from Japanese Patent Application No. 2022-063491, filed Apr. 6, 2022, the entire contents of which are incorporated herein by reference.

FIELD

Embodiments described herein relate generally to a point of sale (POS) system for managing information collected from a plurality of POS terminals, a method executed by a POS system, and a non-transitory computer readable medium storing a program for managing information collected from a plurality of POS terminals.

BACKGROUND

In the past, data related to commercial transactions has been generated by stores such as retail stores. On the other hand, manufacturers that manufacture items sold at stores analyze what kind of items are being purchased to what kind of customers, and conduct promotions based on the results of the analysis. For example, conventionally, a technique has been proposed for stores to manage sales/customer data in which customer data inputted by POS (point of sale) terminals at stores and sales data at the point of sale are associated with each other, so that the data can be shared with a predetermined partner such as a manufacturer.

In recent years, various types of big data are generated by various entities other than stores. Such big data includes various kinds of information, which may be used for promotion or the like by performing aggregation, analysis, and the like.

However, the fields and formats of data generated by various entities are generally different depending on the data systems, even if the data is of the same type. Therefore, conventionally, a system for performing data processing is designed for each data system.

SUMMARY OF THE INVENTION

Embodiments provide a data processing apparatus and a program that can collectively perform data processing of various data.

In one embodiment, a POS system for managing information collected from a plurality of POS terminals, includes a first POS terminal used in a first store and configured to generate first sales information in a first format including one or more data fields each storing data related to an item purchased in a first sales transaction. The system further includes a second POS terminal used in a second store and configured to generate second sales information in a second format different from the first format and including one or more data fields each storing data related to an item purchased in a second sales transaction. The system further includes a store server communicating with the first and second POS terminals and configured to manage the first and second sales information. The system further includes a POS data management server communicating with the store server and configured to: acquire the first and second sales information from the store server, when the item indicated in the first sales information is identical to the item indicated in the second sales information, modify the first and second sales information such that each of the first and second sales information includes the same data fields, aggregate the data stored in the corresponding data fields of the first and second sales information, and transmit the aggregated data to the store server or an external device.

BRIEF DESCRIPTION OF THE DRAWINGS

FIG. 4 is a diagram of a data structure of purchase information according to an embodiment.

FIG. 5 is a diagram of a data structure of scan information according to an embodiment.

FIG. 6 is a diagram of a data structure of posting information according to an embodiment.

FIG. 7 is a diagram of a data structure of promotion information according to an embodiment.

FIG. 9 is a flowchart of processing executed by the data processing server.

DETAILED DESCRIPTION

Hereinafter, embodiments will be described in detail with reference to the drawings. However, embodiments of the present invention are not limited to the embodiments described below.

Figure 1:
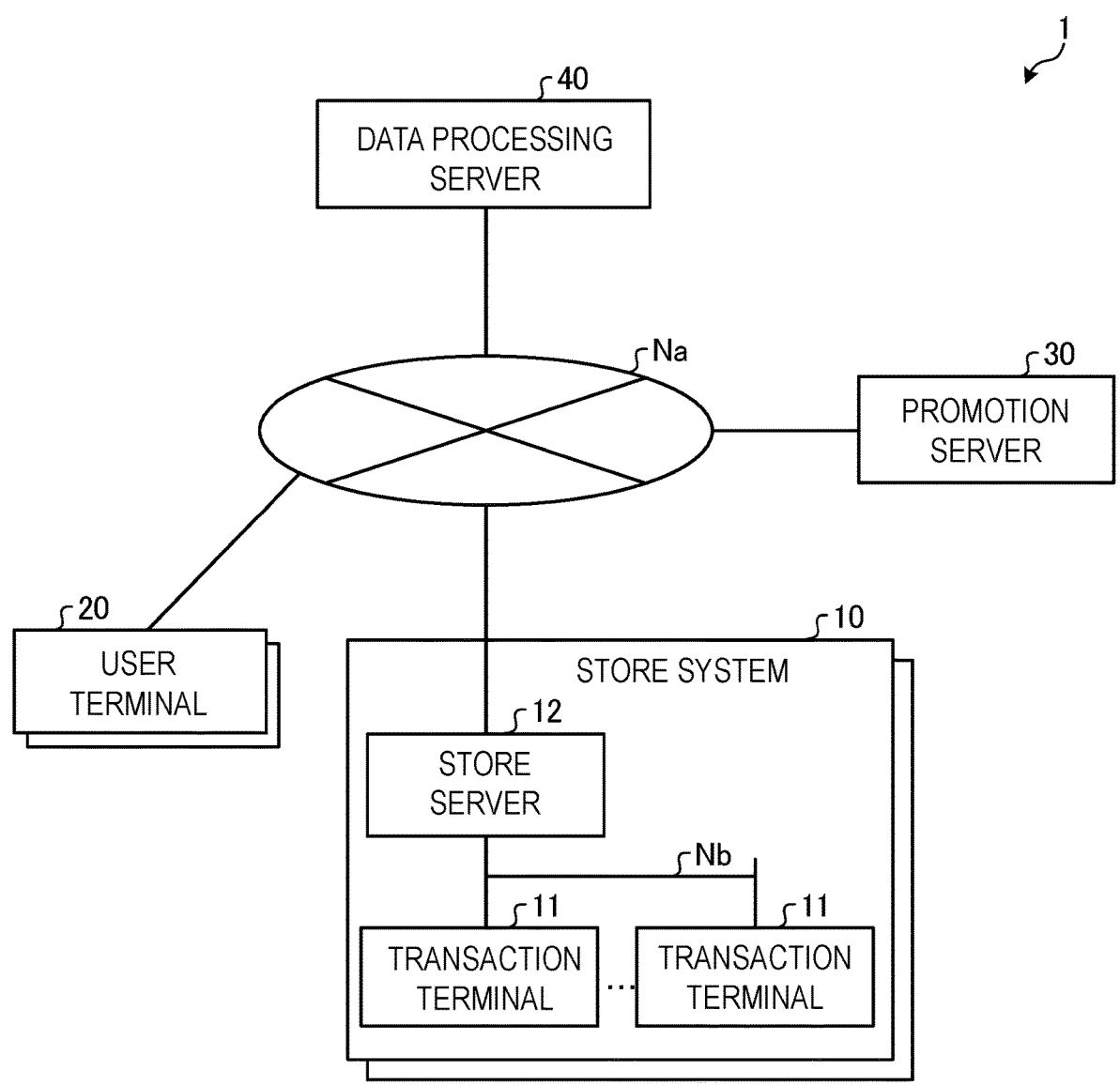
FIG. 1 is a system diagram of a data processing system according to an embodiment.

FIG. 1 is a diagram of a configuration of a data processing system 1 according to an embodiment. As illustrated in FIG. 1, the data processing system 1 includes a plurality of transaction terminals 11 (e.g., POS terminals) and a store server 12 of a store system 10 operated by each store, a user terminal 20 carried by each user or customer, a promotion server 30, and a data processing server 40. The data processing system 1 may be referred to as a POS system or a POS data management system, and the data processing server 40 may be referred to as a POS data management server.

The store server 12, the user terminals 20, and the promotion server 30 are communicably connected to the data processing server 40 via a network Na such as the Internet.

The store system 10 (i.e., the store server 12 and the transaction terminals 11), the user terminal 20, and/or the promotion server 30 can be data suppliers of sales/customer data.

The transaction terminals 11 and the store server 12 are provided in each of the store systems 10 operated by retail stores. The transaction terminals 11 and the store server 12 provided in the same store system 10 are communicably connected via a networked Nb such as LAN (Local Area Network).

Each transaction terminal 11 is a sales data processing device, such as a POS terminal, which can generate sales data of items sold at the store. The transaction terminal 11 executes a registration process of registering an item purchased by a user who has visited the store and a payment processing of the registered item. Further, the transaction terminal 11 transmits the processing result of the registration processing and the payment processing as purchase information to the store server 12.

The transaction terminal 11 is not limited to a device executing both the registration process and the payment processing, and may execute any one of the processes. For example, in a semi-self-service checkout system, a registration device that performs registration processing and a payment device that performs payment processing are separately provided. In this case, the transaction terminal 11 may have the functions of one or both of such registration and payment devices.

The transaction terminal 11 may be a terminal device such as a tablet terminal operated by a user in a store or a terminal device such as a smartphone carried by the user (for example, the user terminal 20). In such a configuration, the user can register an item and cancel the registered item in the store by scanning the item code attached to the item in the form of a bar code or the like using a camera or the like provided in the transaction terminal 11. In addition, the user can pay for the item by electronic payment using the transaction terminal 11 or by transmitting information of the item registered by the transaction terminal 11 to a payment device installed in the store. Note that the transaction terminal 11 transmits the information of the item registered and canceled by its own apparatus and the order of scanning as the scan information to the store server 12.

The store server 12 is a server device provided in each store system 10. The store server 12 stores an item master database in which the item code of each item is associated with item information such as an item name, a classification, and a price of the item, and provides the item master database to each of the transaction terminals 11.

Further, the store server 12 receives various types of data transmitted from each of the transaction terminals 11, and transmits the data to the data processing server 40.

Specifically, the store server 12 receives the scan information and the purchase information transmitted from each transaction terminal 11, and stores the scan information and the purchase information in a storage device (not shown). Then, the store server 12 transmits the scan information and the purchase information stored in the storage device to the data processing server 40 at a predetermined timing.

Note that the timing at which the data is transmitted to the data processing server 40 is not particularly limited, and can be arbitrarily set. For example, the store server 12 may transmit data to the data processing server 40 on a periodic schedule, such as once a day. Further, for example, the store server 12 may transmit data to the data processing server 40 every time data is received from the transaction terminal 11.

The user terminal 20 is a terminal device possessed by a user. The user terminal 20 is, for example, a stationary terminal device such as a PC (Personal Computer), or a portable terminal device such as a laptop computer, a tablet terminal, or a smartphone.

Various programs are stored in the user terminal 20. The user terminal 20 includes a processor that executes the programs for various kinds of processing. For example, the user terminal 20 functions as a transaction terminal 11 by performing the registration processing in the store system described above. Further, for example, the user terminal 20 functions as a client of a social media service. In this situation, the user terminal 20 transmits the information posted by the user to the social media service as a part of the posting information to the data processing server 40. The posting destination is not limited to the social media service, and may be a publicly known service or a unique service provided by the data processing system 1.

The promotion server 30 manages data storing a promotion plan such as a sales promotion. The promotion server 30 is managed by, for example, a company that manufactures and sells an item, an advertisement agent that produces an advertisement, or the like.

The promotion server 30 generates, in response to an operation of the operator, promotion information indicating an item to be promoted, a period during which the promotion is performed, a promotion method, and the like, and transmits the promotion information to the store system 10 (for example, the store server 12). In the store, the promotion of the target item is performed based on the promotion information transmitted from the promotion server 30. The promotion server 30 may transmit the generated promotion information to the data processing server 40. The data processing server 40 collects data from devices connected to the networked Na, processes the data, and provides the processed data to a predetermined provider.

Specifically, the data processing server 40 executes processing for standardizing data formats in order to be able to collectively handle the same type of data among the collected data. Further, the data processing server 40 collects or analyzes the data based on the data fields included in the various types of data subjected to the processing, for each of the same types or between different types, and generates processing result information as a processing result. Then, the data processing server 40 outputs the generated processing result information to an external device such as the promotion server 30.

In the present embodiment, the data processing server is a single server device, but embodiments of the present invention are not limited thereto. For example, the data processing server 40 may be a plurality of server devices by, for example, a technique such as cloud computing.

Next, the configuration of the above-described data processing server 40 will be described.

Figure 2:
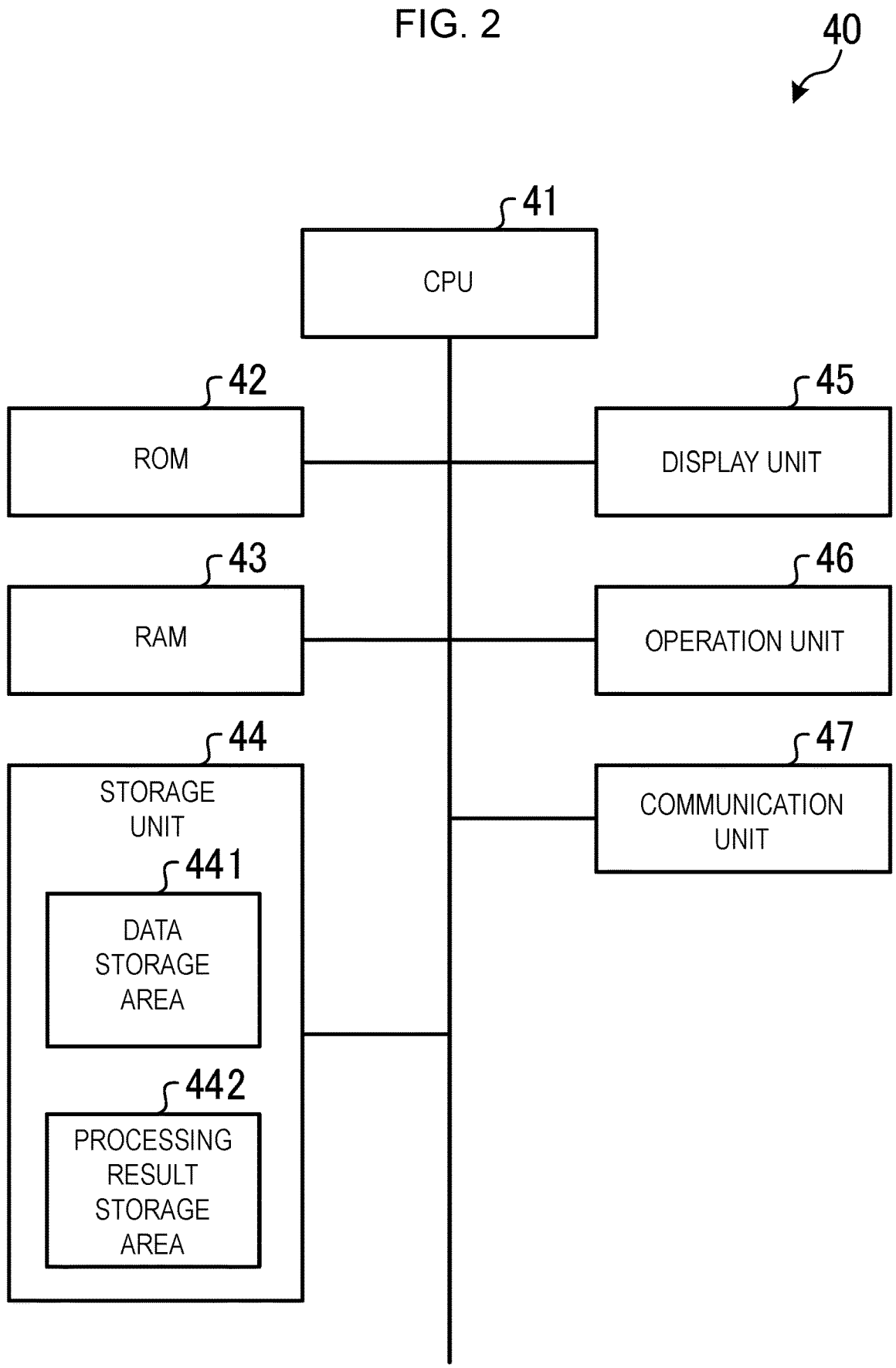
FIG. 2 is a hardware block diagram of a data processing server according to an embodiment.

FIG. 2 is a hardware block diagram of the data processing server 40. As shown in FIG. 2, the data processing server 40 includes a CPU (Central Processing Unit) 41, a ROM (Read Only Memory) 42, and a RAM (Random Access Memory) 43.

The CPU 41 is a processor and controls the units of the data processing servers 40. The ROM 42 stores various programs. The RAM 43 is a working memory in which programs and various types of data are temporarily stored.

The data processing server 40 includes a storage unit 44, a display unit 45, an operation unit 46, and a communication unit 47.

The storage unit 44 is a storage device such as an HDD (Hard Disk Drive) or a flash memory, and maintains data even if the power supply is cut off. The storage unit 44 stores programs that can be executed by the CPU 41 and various types of setting data. Further, the storage unit 44 stores various conversion tables to be described later. Further, the storage unit 44 may store the item master database used in each of the stores.

Further, the storage unit 44 includes a data storage area 441 for storing various types of data transmitted from external devices such as the store system 10, the user terminal 20, and the promotion server 30, and a processing result storage area 442 for storing processing result information that is a processing result of the data.

The display unit 45 includes a display device such as an LCD (Liquid Crystal Display). The display unit 45 displays various types of data under the control of the CPU 41. The operation unit 46 includes a keyboard, a pointing device, and the like. The operation unit 46 outputs a signal corresponding to an input made by the operator to the CPU 41. The operation unit 46 may be a touch panel provided on a display screen of the display unit 45.

The communication unit 47 is a network interface circuit connectable to the networked Na. The communication unit 47 communicates with an external device such as the store system 10 (e.g., the store server 12), the user terminal 20, and the promotion server 30 via the networked Na.

Figure 3:
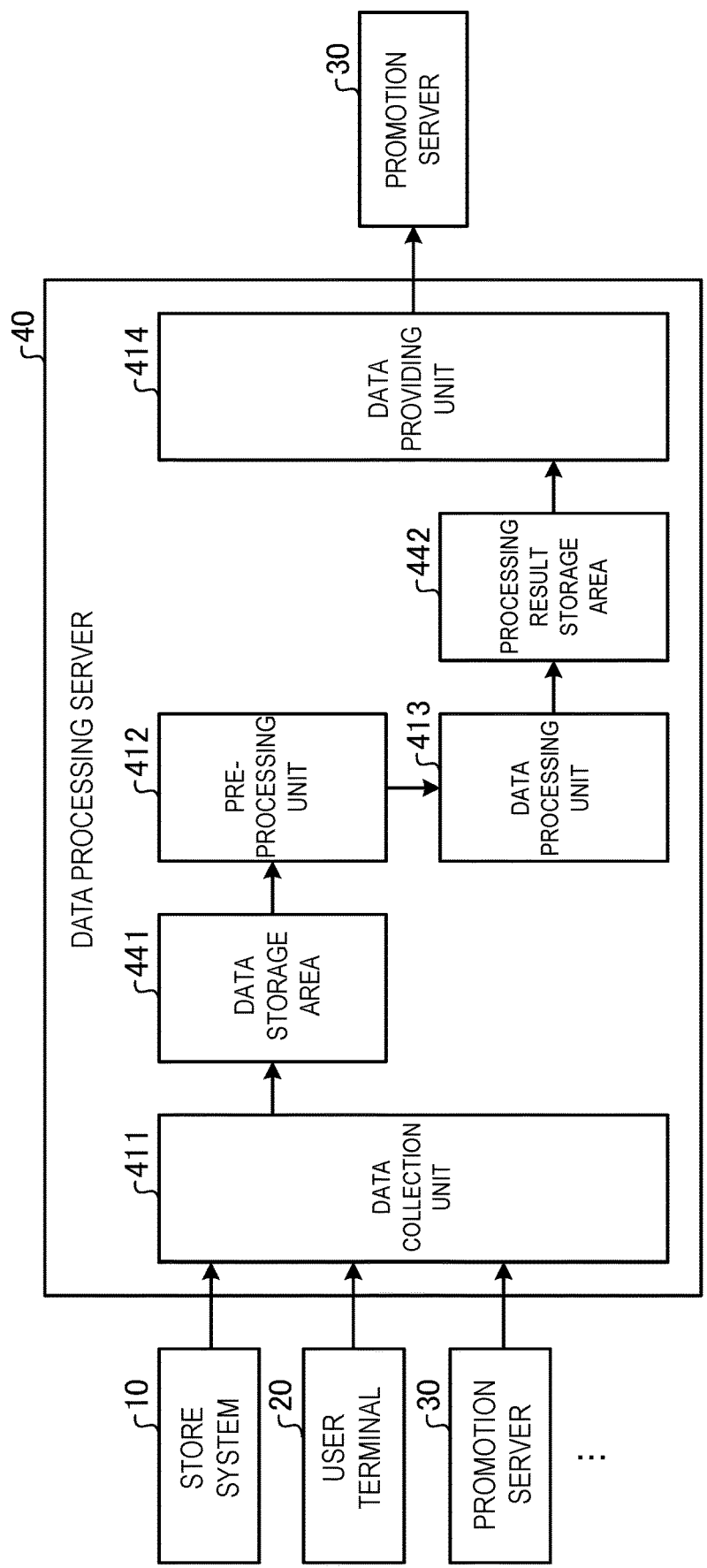
FIG. 3 is a functional block diagram of the data processing server.

Next, the functional configuration of the data processing server 40 will be described with reference to FIG. 3. FIG. 3 is a functional block diagram of the data processing server 40.

As illustrated in FIG. 3, the data processing server or its CPU 41 performs the functions of a data collection unit 411, a preprocessing unit 412, a data processing unit 413, and a data providing unit 414.

Some or all of the functions of the data processing server 40 may be performed by the CPU 41 according to one or more programs stored in the ROM 42 or the storage unit 44. In addition, some or all of those functions may be performed by hardware such as a dedicated circuit mounted in the data processing server 40.

The data collection unit 411 collects various types of data from external devices such as the store system 10, the user terminal 20, and the promotion server 30 via the communication unit 47, and stores the collected data in the data storage area 441.

Specifically, the data collection unit 411 collects purchase information, scan information, and the like transmitted from each of the store systems 10 (e.g., the store servers 12). In addition, the data collection unit 411 collects scan information and posting information transmitted from each of the user terminals 20. The data collection unit 411 also collects promotion information transmitted from the promotion server 30.

Hereinafter, data structures of data collected by the data collection unit 411 will be described.

FIG. 4 is a diagram of a data structure of purchase information 50. As illustrated in FIG. 4, the purchase information 50 includes, as data fields, a store ID 51, a transaction ID 52, a transaction date and time (D/T) 53, a user ID 54, a registered item 55, a total count 56, a total amount 57, a payment amount 58, a change 59, and the like.

The store ID 51 is a store identifier for identifying the store or the store system 10 that has transmitted the purchase information. The transaction ID 52 is a transaction identifier for identifying the transactions performed in the store system 10 corresponding to the store ID 51. The transaction date and time 53 is date and time information indicating the date and time when the transaction corresponding to the transaction ID was performed. The user ID 54 is a user identifier for identifying the user who has performed the transaction corresponding to the transaction ID.

The registered item 55 holds information about the items purchased in the transaction corresponding to the transaction ID. Specifically, the registered item 55 includes sub-fields for storing an item code, an item name, a price, and a count of each registered item. Here, the item code is an item identifier of the purchased item. The item name is the name of the item corresponding to the item code. The price is the price (i.e., unit price) of the item corresponding to the item code. The count means the quantity of the item purchased.

The total count 56 is a total count of the items purchased in the transaction corresponding to the transaction ID. The total count 56 corresponds to the total value of the counts of the items registered in the registered item 55. The total amount 57 is the total amount of the items purchased in the transaction corresponding to the transaction ID. The total amount 57 corresponds to the total amount of the multiplication value of the price and the count of each item registered in the registered item 55. The payment amount 58 is the amount paid by the user in the transaction corresponding to the transaction ID. The change 59 is the amount of change in the transaction corresponding to the transaction ID. The change 59 corresponds to an amount obtained by subtracting the total amount 57 from the payment amount 58.

Note that the data fields of the purchase information 50 are not limited to the example of FIG. 4. For example, since some store systems 10 do not require the user ID to be entered at the time of transaction, the purchase information 50 may not include the data field of the user ID 54. Further, since the data fields of the total count 56 and the total amount 57 can be calculated from the data fields of the registered item 55, the purchase information 50 may not include the data fields of the total count 56 and the total amount 57.

FIG. 5 is a diagram of a data structure of scan information 60. As illustrated in FIG. 5, the scan information 60 includes a store ID 61, a transaction ID 62, a user ID 63, and an operation history 64.

The store ID 61 is a store identifier for identifying the store or the store system 10 that has transmitted the scan information. The transaction ID 62 is the transaction identifier of the transaction related to the scan information. The user ID 63 is the user identifier of the user who has performed a scan operation related to the scan information.

The operation history 64 holds the history of the registration and cancellation operation of the items. Specifically, the operation history 64 includes sub-fields of an item code, an item name, a price, an operation type, and an operation date and time (D/T). Here, the item identifier is an item identifier of an item which is a target of registration or cancellation. The item name is the name of the item corresponding to the item code. The price is the price of the item corresponding to the item code. The operation type is information for identifying which operation of registration or cancellation was performed. The operation date and time is date and time information indicating the date and time of the registration or cancellation operation.

Note that the data fields of the scan information 60 are not limited to the example of FIG. 5. For example, since some store systems 10 do not require any user ID to be entered at the time of transaction, the scan information 60 may not include the data field of the user ID 63. In addition, for example, since there is a store system 10 to which a transaction ID is given at the time of payment, the scan information 60 may not include the data field of the transaction ID 62.

Further, in the present embodiment, the item code and the item name stored in the purchase information 50 and the scan information 60 are common to each of the store systems 10, but embodiments of the present invention are not limited to this embodiment. For example, even for the item of the same type, each store system 10 may assign different item codes and item names.

In such a case, the data processing server 40 stores in advance a conversion table (hereinafter, referred to as an item conversion table) in which a plurality of item codes and item names used by the respective store systems 10 are associated with each other in the storage unit 44 or the like for each type of item. Thus, in the data processing server 40, the item conversion table can be used to identify the item of the same type represented by a plurality of item codes or item names.

FIG. 6 is a diagram of a data structure of posting information 70. As illustrated in FIG. 6, the posting information 70 includes a posted date and time (D/T) 71, a user ID 72, a posted content 73, and the like.

The posted date and time 71 is date and time information indicating the date and time when posting to a social media service was performed by a user. The user ID 72 is the user identifier of the user who has posted some information such as a comment to the social media service. The posted content 73 holds the content of the post such as a comment posted to the social media service by the user corresponding to the user ID 72. For example, the posted content 73 holds a comment regarding an item purchased by the user.

The data fields of the posting information 70 are not limited to the example of FIG. 6. For example, the posting information 70 may include a data field for identifying the social media service.

In the present embodiment, the same user ID is assigned to a user and stored in the purchase information 50, the scan information 60, and the posting information 70, but embodiments of the present invention are not limited to this configuration. For example, a single user is assigned different user IDs in different store systems 10. Also, a user ID used in a store system 10 may differ from a user ID used in a social media service. Thus, a plurality of different user IDs may be selectively used by the same user depending on the store system 10 or the service used.

In such cases, for each user, the data processing server 40 stores in advance a conversion table (hereinafter referred to as a user ID conversion table) in which a plurality of user IDs used by the user are associated with each other. Thus, in the data processing server 40, even when a user uses a plurality of user IDs, the user ID conversion table can be used to identify the user from any user ID.

FIG. 7 is a diagram of a data structure of promotion information 80. As illustrated in FIG. 7, the promotion information 80 includes a promotion ID 81, a promotion period 82, a promotion target 83, a promotion content 84, and the like.

The promotion ID 81 is a promotion identifier for identifying a promotion. The promotion period 82 indicates a period during which the promotion is performed. The promotion target 83 instructs the item name or the like of the item to be promoted. The promotion content 84 holds a method, a condition, and the like for performing the promotion. For example, the promotion content 84 holds information indicating a discount rate, information indicating an increase in a point accumulation rate, and the like.

The data fields of the promotion information are not limited to the example of FIG. 7. For example, the promotion target 83 is not limited to an item, and may be a specific store. In this case, the promotion server 30 may transmit the promotion information not including the promotion target 83, or the promotion information in which the promotion target 83 is blank, to the data processing server 40.

Referring back to FIG. 3, the preprocessing unit 412 performs preprocessing such as standardizing the format of the data collected by the data collection unit 411. Specifically, the preprocessing unit 412 reads data to be processed from the data storage area 441.

Here, the data to be read can be arbitrarily set by setting conditions and the like. For example, the preprocessing unit 412 may read data for one day on a daily basis based on the date and time information included in each data, or may read data for a predetermined period such as one month. Further, for example, the preprocessing unit 412 may read data corresponding to the period based on the promotion period included in the promotion information.

Further, the preprocessing unit 412 classifies the read data by type. For example, the preprocessing unit 412 classifies the read data according to various types of purchase information 50, scan information 60, posting information 70, and promotion information 80.

Then, the preprocessing unit 412 performs preprocessing to make the format common for the same type of data. For example, the preprocessing unit 412 executes name matching for the user having different user ID or the item having different codes or names by using the item conversion table or the user ID conversion table described above. In addition, the preprocessing unit 412 executes data cleansing for deleting or correcting an erroneous description or fluctuation of description. For example, the preprocessing unit 412 executes the data cleansing by referring to a data table that associates the type of the erroneous description or fluctuation of description with the correction method.

In addition, the preprocessing unit 412 executes preprocessing for correcting the data fields of the collected information in a case where the data field constituting the same type of data is different from the reference structure. Specifically, the preprocessing unit 412 executes processing for adding insufficient data fields and processing for excluding unnecessary data fields.

Figure 8A:
FIGS. 8A to 8C are diagrams illustrating an exemplary preprocessing executed by the data processing server according to an embodiment.
Figure 8B:
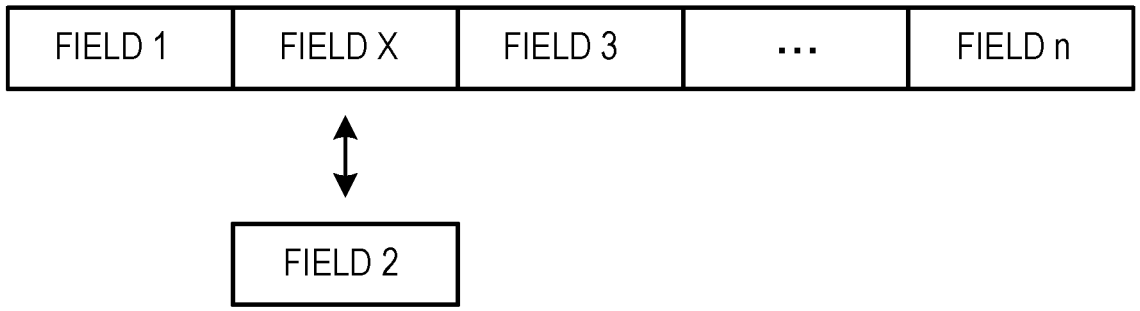
Figure 8C:
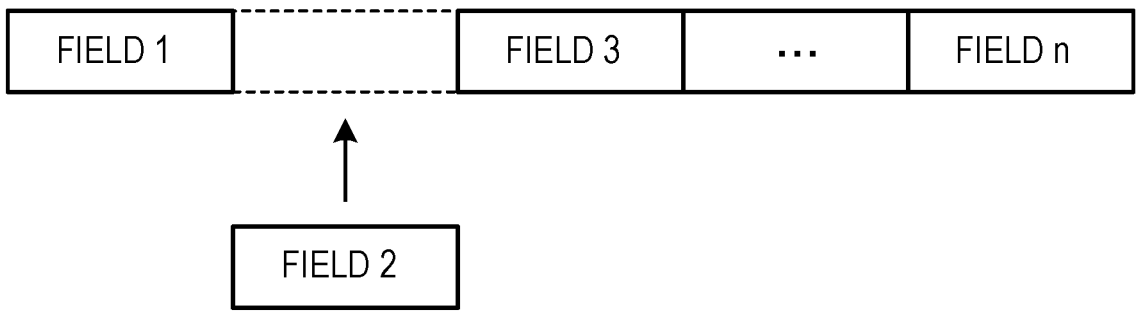

With reference to FIGS. 8A-8C, a preprocessing related to addition or deletion of a data field will be described. FIGS. 8A to 8C are diagrams explaining an exemplary preprocessing performed by the preprocessing unit 412. Here, FIG. 8A shows the structure of reference data fields. Further, FIGS. 8B and 8C show exemplary data fields of data read by the preprocessing unit 412.

For example, in the data structure of FIG. 8B, the second data field is "field X". In this case, the preprocessing unit 412 compares the data structure with the reference data structure, and determines that "field 2" does not exist in the data structure in FIG. 8B, and instead the unnecessary "field X" is included. Next, the preprocessing unit 412 removes the "field X" determined to be unnecessary from the data in FIG. 8B, and executes a process of adding the insufficient "field 2" to the data in FIG. 8B.

The data value of the newly added "field 2" may be blank or may be a predetermined fixed data value (hereinafter, also referred to as a fixed data value). For example, the fixed data value may be a data value or the like that instructs to exclude the corresponding data field from the processing target of the data processing unit 413.

In addition, the preprocessing unit 412 may determine whether the data value of the "field 2" can be derived from the data value of the "field X" or the other data field, and may add the derived data value to the "field 2" when the data value can be derived.

For example, when the "field 2" corresponds to the total count 56 or the total amount 57 of the purchase information 50 described above, and the registered item 55 exists as the existing data field, the preprocessing unit 412 calculates the total count or the total amount of the item from the registered item 55 as the data value of "field 2". Then, the preprocessing unit 412 sets the derived data value in the "field 2" in place of the value of the "field X".

Further, for example, in the data structure of FIG. 8C, the "field 2" is missing. In this situation, the preprocessing unit 412 compares the data structure with the reference data structure, and determines that the "field 2" does not exist in the data structure shown in FIG. 8C. Then, the preprocessing unit 412 executes a process of adding the missing "field 2" to the data in FIG. 8C as in the case of FIG. 8B.

The preprocessing unit 412 performs the above preprocessing to standardize the format of data. Thus, in the data processing server 40, data processing for various types of data can be performed in a general-purpose manner in the processing of the data processing unit 413 in the subsequent stage.

Returning to FIG. 3, the data processing unit 413 aggregates or analyzes the data subjected to the preprocessing by the preprocessing unit 412, and generates processing result information as a processing result. Further, the data processing unit 413 stores the generated processing result information in the processing result storage area 442.

Specifically, the data processing unit 413 aggregates or analyzes the data subjected to the preprocessing for each data type (i.e., purchase information 50, scan information 60, posting information 70, and promotion information 80) based on the data fields thereof, and generates processing result information.

For example, the data processing unit 413 totals the total count and the amount of money in a specific period of a specific item sold in each of the stores based on the registered item 55 included in the purchase information 50. Further, the data processing unit 413 analyzes the purchase tendency of the item for each user using the user ID 63, and totalizes the number of purchases of the item and the total amount for each user during the specified time period.

Further, for example, the data processing unit 413 totalizes the cancellation frequency for each item based on the operation history 64 included in the scan information 60. Further, the data processing unit 413 analyzes the tendency of the order of registering the items for each user using the user ID 63, and aggregates the frequency of cancellation of the items for each user.

Further, for example, the data processing unit 413 refers to the posted content 73 of the posting information 70 and aggregates data of the items, the names of which were referred to in social media services. Further, the data processing unit 413 uses the user ID 72 to aggregate the number of posts to social media services for each user, and analyzes the degree of reference to the item for each user. Further, for example, the data processing unit 413 refers to the promotion period 82 and the promotion target 83 of the promotion information 80, and aggregates the promotion frequency for each item.

Further, the data processing unit 413 aggregates or analyzes the data based on the data fields of the preprocessed data across a plurality of data types, and generates processing result information.

For example, the data processing unit 413 analyzes the correlations between the items referred to in social media services and the sales numbers of the items based on the registered items 55 included in the purchase information 50 and the item names included in the posted content 73 of the posting information 70. Further, the data processing unit 413 aggregates the numbers of the promotion target items sold during the promotion period on the basis of the respective data fields included in the promotion information 80 and the registered items 55 included in the purchase information 50. Further, the data processing unit 413 compares the sales numbers before and after the promotion period to analyze the effect of the promotion method set in the promotion content and the like.

The method of aggregation and analysis are not limited to the above examples, and can be arbitrarily set. For example, the data processing unit 413 sets a target and a method of aggregation and analysis in response to a request from a company or the like that is a providing destination of the processing result information.

The data providing unit 414 is controls the communication unit 47 to transmit the processing result of the data processing unit 413 to an external device. Specifically, the data providing unit 414 reads the processing result information stored in the processing result storage area 442, and issues the read processing result information to the external device of the request destination that requests data aggregation or analysis.

The destination of the processing result information is not particularly limited, and can be arbitrarily set. FIG. 3 illustrates the promotion server 30 as a destination of the processing result information. In this case, for example, the data processing server 40 may analyze the effect of the promotion performed by the promotion server on the store, and provide the processing result information indicating the analysis result to the promotion server 30. Thus, the promotion server 30 can be used to consider the next promotion plan after confirming the effect of the promotion indicated by the promotion information.

The destination of the analysis result information is not limited to the promotion server 30, and for example, but may be, for example, a specific store system 10 or a company that operates the specific store system 10.

Hereinafter, an operation example of the above-described data processing server 40 will be described. FIG. 9 is a flowchart of processing executed by the data processing server 40.

First, the data collection unit 411 collects data from external devices such as the store systems 10, the user terminals 20, and the promotion server 30 (step S11). When the data is collected, the data collection unit 411 stores the collected data in the data storage area 441.

Subsequently, the preprocessing unit 412 reads the data for a predetermined period from the data storage area 441 (step S12). Next, the preprocessing unit 412 classifies the read data by each data type (step S13). Next, the preprocessing unit 412 performs preprocessing on the classified data to standardize the format for each data type (step S14).

Subsequently, the data processing unit 413 aggregates or analyzes the data with the common format by data type or across the data types (step S15). When the aggregation or analysis is completed, the data processing unit 413 stores, as a processing result, processing result information in the processing result storage area 442.

Subsequently, the data providing unit 414 controls the communication unit 47 to transmit the processing result information stored in the processing result storage area 442 to the requester who has requested the aggregation or analysis (step S16), and ends the present processing.

As described above, the data processing server 40 of the present embodiment collects data from one or a plurality of data suppliers, classifies the collected data by data type, and performs preprocessing in which the format is standardized for each of the classified data. In addition, the data processing server 40 performs aggregation or analysis of the preprocessed data based on the data fields included in each of the data types or across the data types, and outputs the processing result.

As a result, the data processing server 40 can handle various types of data collected from data suppliers, and collectively perform data processing of such data.

The programs executed by the devices of the above-described embodiments are provided in advance in a read only memory (ROM), a storage unit, or the like. The programs executed by the devices of the above-described embodiments may be provided by being recorded in a non-transitory computer-readable storage or recording medium such as a CD-ROM, a flexible disk (FD), a CD-R, or a DVD (Digital Versatile Disk) in an installable format or an executable format.

Further, the programs executed by each device of the above-described embodiment may be stored in a computer connected to a network such as the Internet, and may be downloaded via the network.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A point of sale (POS) system for managing information collected from a plurality of POS terminals, comprising:
   a first POS terminal used in a store and configured to generate first sales information in a first format including one or more data fields each storing data related to an item purchased in a first sales transaction;
   a second POS terminal used in the store and configured to generate second sales information in a second format different from the first format and including one or more data fields each storing data related to an item purchased in a second sales transaction;
   a store server configured to communicate with the first and second POS terminals and manage the first and second sales information;
   a promotion server configured to generate promotion information associated with an item and indicating a promotion performed thereon; and
   a POS data management server configured to:
     store reference data indicating reference data fields to be included in sales information,
     acquire the first and second sales information from the store server,
     compare the data fields of each of the first and second sales information with the reference data fields, and determine whether one or more missing data fields exist in each of the first and second sales information,
     upon determining that one or more missing data fields exist in one or both of the first and second sales information, add the missing data fields to one or both of the first and second sales information, generate additional data to be added to each of the missing data fields, and write the additional data into each of the missing data fields,
     determine that a particular item is associated with promotion information acquired from the promotion server,
     aggregate the data stored in the corresponding data fields of the first and second sales information and related to the particular item associated with the promotion information, and
     transmit the aggregated data to the promotion server.

2. The POS system according to claim 1, wherein the additional data is blank data or preset data.

3. The POS system according to claim 1, wherein the POS data management server is configured to calculate the additional data from the data stored in the other data fields of said one or both of the first and second sales information.

4. The POS system according to claim 1, wherein
   the first sales information includes a first data field that stores a quantity of the particular item purchased in the first sales transaction,
   the second sales information includes a second data field that corresponds to the first data field and stores a quantity of the particular item purchased in the second sales transaction, and
   the POS data management server is configured to aggregate the quantity of the particular item stored in each of the first and second data fields.

5. The POS system according to claim 1, further comprising:
   a user terminal held by a customer and configured to generate posting information indicating a comment about an item that the customer posted online, wherein
   the POS data management server is configured to:
     acquire posting information about the particular item from the user terminal, and
     associate the aggregated data with the posting information to output.

6. A method executed by a point of sale (POS) system for managing information collected from a plurality of POS terminals, the method comprising:
   storing reference data indicating reference data fields to be included in sales information;
   acquiring, from a first POS terminal used in a store, first sales information in a first format including one or more data fields each storing data related to an item purchased in a first sales transaction;
   acquiring, from a second POS terminal used in the store, second sales information in a second format different from the first format and including one or more data fields each storing data related to an item purchased in a second sales transaction;
   comparing the data fields of each of the first and second sales information with the reference data fields, and determining whether one or more missing data fields exist in each of the first and second sales information;
   in response to determining that one or more missing data fields exist in one or both of the first and second sales information, adding the missing data fields to one or both of the first and second sales information, generating additional data to be added to each of the missing data fields, and writing the additional data into each of the missing data fields;
   determining that a particular item is associated with promotion information acquired from a promotion server;
   aggregating the data stored in the corresponding data fields of the first and second sales information and related to the particular item associated with the promotion information; and
   transmitting the aggregated data to the promotion server.

7. The method according to claim 6, wherein the additional data is blank data or preset data.

8. The method according to claim 6, wherein
   generating additional data includes calculating the additional data from the data stored in the other data fields of said one or both of the first and second sales information.

9. The method according to claim 6, wherein
the first sales information includes a first data field that stores a quantity of the particular item purchased in the first sales transaction,
the second sales information includes a second data field that corresponds to the first data field and stores a quantity of the particular item purchased in the second sales transaction, and
aggregating includes aggregating the quantity of the particular item stored in each of the first and second fields.

10. The method according to claim 6, further comprising:
acquiring, from a user terminal held by a customer, posting information indicating a comment about the particular item that the customer posted online; and
associating the aggregated data with the posting information.

11. A non-transitory computer readable medium storing a program for managing information collected from a plurality of POS terminals, wherein the program executed on a computer causes the computer to execute a method comprising:
storing reference data indicating reference data fields to be included in sales information;
acquiring, from a first POS terminal used in a store, first sales information in a first format including one or more data fields each storing data related to an item purchased in a first sales transaction;
acquiring, from a second POS terminal used in the store, second sales information in a second format different from the first format and including one or more data fields each storing data related to an item purchased in a second sales transaction;
comparing the data fields of each of the first and second sales information with the reference data fields, and determining whether one or more missing data fields exist in each of the first and second sales information;
in response to determining that one or more missing data fields exist in one or both of the first and second sales information, adding the missing data fields to one or both of the first and second sales information, generating additional data to be added to each of the missing data fields, and writing the additional data into each of the missing data fields;
determining that a particular item is associated with promotion information acquired from a promotion server;
aggregating the data stored in the corresponding data fields of the first and second sales information and related to the particular item associated with the promotion information; and
transmitting the aggregated data to the promotion server.

* * * * *